No. 853,247. PATENTED MAY 14, 1907.
A. LE BLANC.
HEADLIGHT FOR VEHICLES.
APPLICATION FILED JUNE 28, 1906.
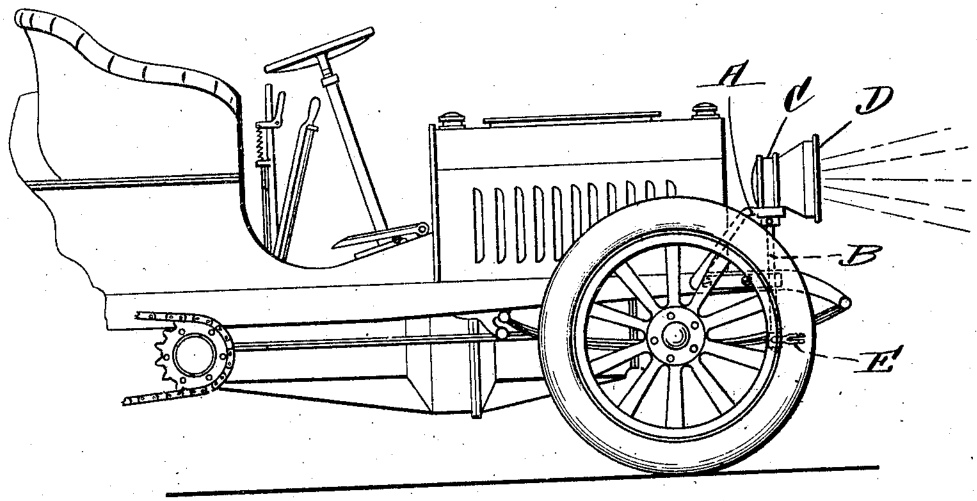
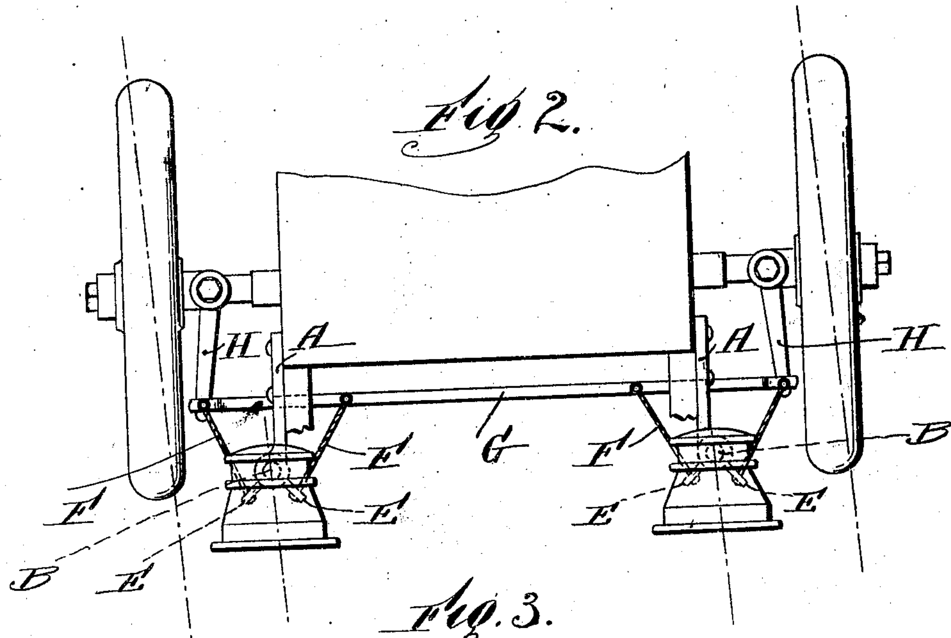
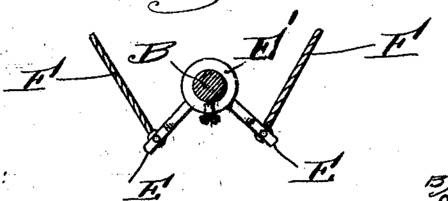
Witnesses:
C. F. Wesson
M. E. Regan.
Inventor:
A LeBlanc.
By Attorneys
Southgate & Southgate

UNITED STATES PATENT OFFICE.

ARTHUR LE BLANC, OF WORCESTER, MASSACHUSETTS.

HEADLIGHT FOR VEHICLES.

No. 853,247. Specification of Letters Patent. Patented May 14, 1907.

Application filed June 28, 1906. Serial No. 323,913.

*To all whom it may concern:*

Be it known that I, ARTHUR LE BLANC, a citizen of the United States, residing at Worcester, in the county of Worcester and State of Massachusetts, have invented a new and useful Headlight for Vehicles, of which the following is a specification.

As at present constructed, vehicles of substantially all kinds are provided with headlights fixed in stationary position so that when curves are rounded the light is thrown to one side of the track or road and thus where it is most needed, it is least available. This results in numerous accidents, and is a constant menace to the public.

The principal object of my invention is to provide a movable head-light and means for turning it with the steering wheels so that it will follow the curve and throw the light into a position such that the road or track can be seen at all times during the rounding of the curve, thereby affording protection to the public.

The invention comprises means for accomplishing this result, on cars, automobiles, and other vehicles.

Reference is to be had to the accompanying drawings which illustrate two forms in which the invention may be embodied, and in which, Figure 1 is a side elevation of an automobile provided with a form of my invention. Fig. 2 is a plan of the front portion thereof, and Fig. 3 is a detail plan view partly in section on an enlarged scale of a part of the lamp operating mechanism.

For the purpose of adapting a swinging lamp or pair of swinging lamps to be operated by the motion of the stub axles of an automobile in a convenient and simple manner and in such a way that the lamp may if desired be swung around at a more rapid rate than the wheels turn, whereby the light will be directed along the roadway in advance of the turn of the vehicle itself, I have shown the invention as embodied in a construction in whch the lamp turning mechanism is controlled by the rod which connects the stub-axle levers.

The vehicle, as for example, an automobile, is provided with two brackets A, each of which supports an oscillatable rod B carrying a frame C for supporting a head-light D. This rod is provided with a pair of projections or arms E, one on each side extending from a ring E′ fixed to the rod. These projections are controlled by connections F on the form of chains, cables, or the like, from a bar G which extends across in front of the axle and joins the stub axle levers H so as to move with them at all times. The cramping of the wheels in order to turn the vehicle, of course, results in shifting the bar G longitudinally and this exerts a pull on one of each pair of connections F to turn the rods B and consequently the two head-lights D in proportion to the amount of turning of the stubs. Consequently, the lights will be thrown forward at an angle as the machine rounds a curve.

It will, of course, be understood that the same principle can be applied to other kinds of vehicles, and to the same vehicles, in other ways in accordance with the particular number and construction of head-lights which it is desired to employ, and that other modifications in the construction can be made by any person skilled in the art within the scope of the invention as expressed in the claims.

Having thus fully described my invention, what I claim and desire to secure by Letters-Patent is:—

1. In a vehicle, the combination of a pair of stub-axles, a bar connecting said axles and adapted to operate parallel with their axes, two pairs of flexible connections secured to said bar, a pair of upright rods oscillatably mounted on the vehicle, each having two arms projecting therefrom, both arms on each rod being secured to said flexible connections of one pair, and means on said rods for supporting head lights, whereby the turning of the wheels will cause the head-lights to turn therewith.

2. In a vehicle, the combination of a pair of stub axles, a longitudinally reciprocable bar connecting said axles and movable therewith, two pairs of flexible connections secured to said bar near opposite ends thereof and at a distance apart, a pair of upright rods oscillatably mounted on the vehicle each having two arms projecting therefrom, both arms on each rod being secured to the flexible connections of one pair, and means on said rods for supporting head-lights.

3. In a vehicle having stub axles, the combination of a bar connecting said axles and adapted to reciprocate longitudinally as said axles turn, a pair of flexible connections secured to said bar, an upright rod oscillatably mounted on the vehicle and having two arms projecting therefrom at an angle, the ends of each arm being connected with one of said flexible connections, and means on the rod for supporting a head-light.

In testimony whereof I have hereunto set my hand, in the presence of two subscribing witnesses.

ARTHUR LE BLANC.

Witnesses:
ALBERT E. FAY,
LOUIS W. SOUTHGATE.